United States Patent
Kim et al.

(10) Patent No.: US 11,242,090 B2
(45) Date of Patent: Feb. 8, 2022

(54) FRONT VEHICLE BODY STRUCTURE FOR VEHICLE

(71) Applicants: HYUNDAI MOTOR COMPANY, Seoul (KR); KIA MOTORS CORPORATION, Seoul (KR); MS Autotech Co., Ltd., Gyeongju-si (KR)

(72) Inventors: Min-Soo Kim, Suwon-si (KR); Gee-Young Shin, Suwon-si (KR); Sung-Don Pyun, Suwon-si (KR); Mun-Seok Choi, Uiwang-si (KR); Han-Jung Choi, Osan-si (KR)

(73) Assignees: Hyundai Motor Company, Seoul (KR); Kia Motors Corporation, Seoul (KR); MS AUTOTECH CO., LTD., Gyeongji-si (KR)

( * ) Notice: Subject to any disclaimer, the term of this patent is extended or adjusted under 35 U.S.C. 154(b) by 206 days.

(21) Appl. No.: 16/696,566

(22) Filed: Nov. 26, 2019

(65) Prior Publication Data
US 2020/0180700 A1 Jun. 11, 2020

(30) Foreign Application Priority Data
Dec. 7, 2018 (KR) ........................ 10-2018-0157416

(51) Int. Cl.
| | | |
|---|---|---|
| *B62D 21/15* | (2006.01) | |
| *B62D 27/02* | (2006.01) | |
| *B62D 21/11* | (2006.01) | |
| *B62D 25/08* | (2006.01) | |

(52) U.S. Cl.
CPC ............ *B62D 21/152* (2013.01); *B62D 21/11* (2013.01); *B62D 25/081* (2013.01); *B62D 27/02* (2013.01)

(58) Field of Classification Search
CPC ...... B62D 21/152; B62D 21/15; B62D 21/11; B62D 25/081; B62D 25/08; B62D 27/02
See application file for complete search history.

(56) References Cited

U.S. PATENT DOCUMENTS

2016/0368535 A1\* 12/2016 Kim ..................... B62D 29/008
2017/0369102 A1\* 12/2017 Kim ..................... B62D 21/152

FOREIGN PATENT DOCUMENTS

| JP | 2017114259 A | \* | 6/2017 | ........... B62D 21/152 |
| KR | 10-2015-0107308 A | | 9/2015 | |
| KR | 101765637 B1 | \* | 8/2017 | ........... B62D 25/081 |

\* cited by examiner

*Primary Examiner* — Lori L Lyjak
(74) *Attorney, Agent, or Firm* — Morgan, Lewis & Bockius LLP

(57) ABSTRACT

A front vehicle body structure for a vehicle defining a space which is distinguished from a passenger compartment by a dash panel between front side members disposed along a longitudinal direction of the vehicle. The front vehicle body structure includes: a front shock absorber housing in which a front shock absorber of a front wheel suspension of the vehicle is disposed; a cowl top outer panel connected with lower end portions of front pillars of the vehicle; and a cowl upper cross member disposed below the cowl top outer panel and having a front end portion attached to the front shock absorber housing and a rear end portion attached to the cowl top outer panel.

16 Claims, 13 Drawing Sheets

SECTION A-A

SECTION A'-A'

SECTION B-B

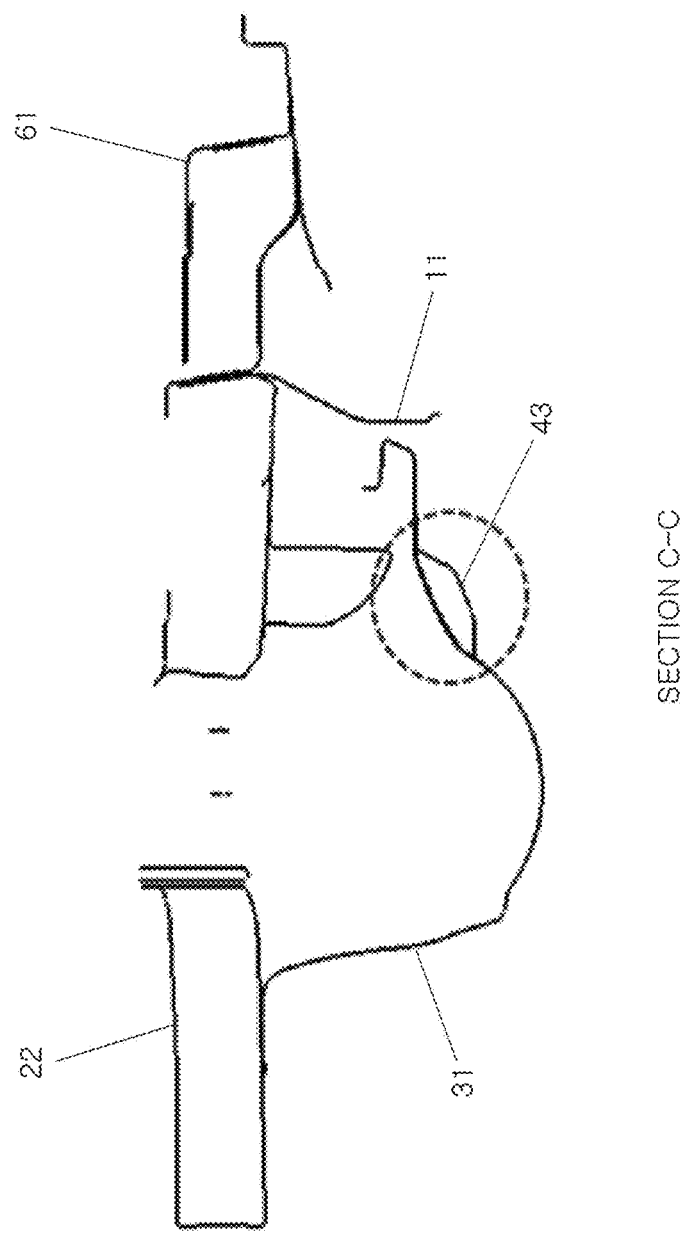

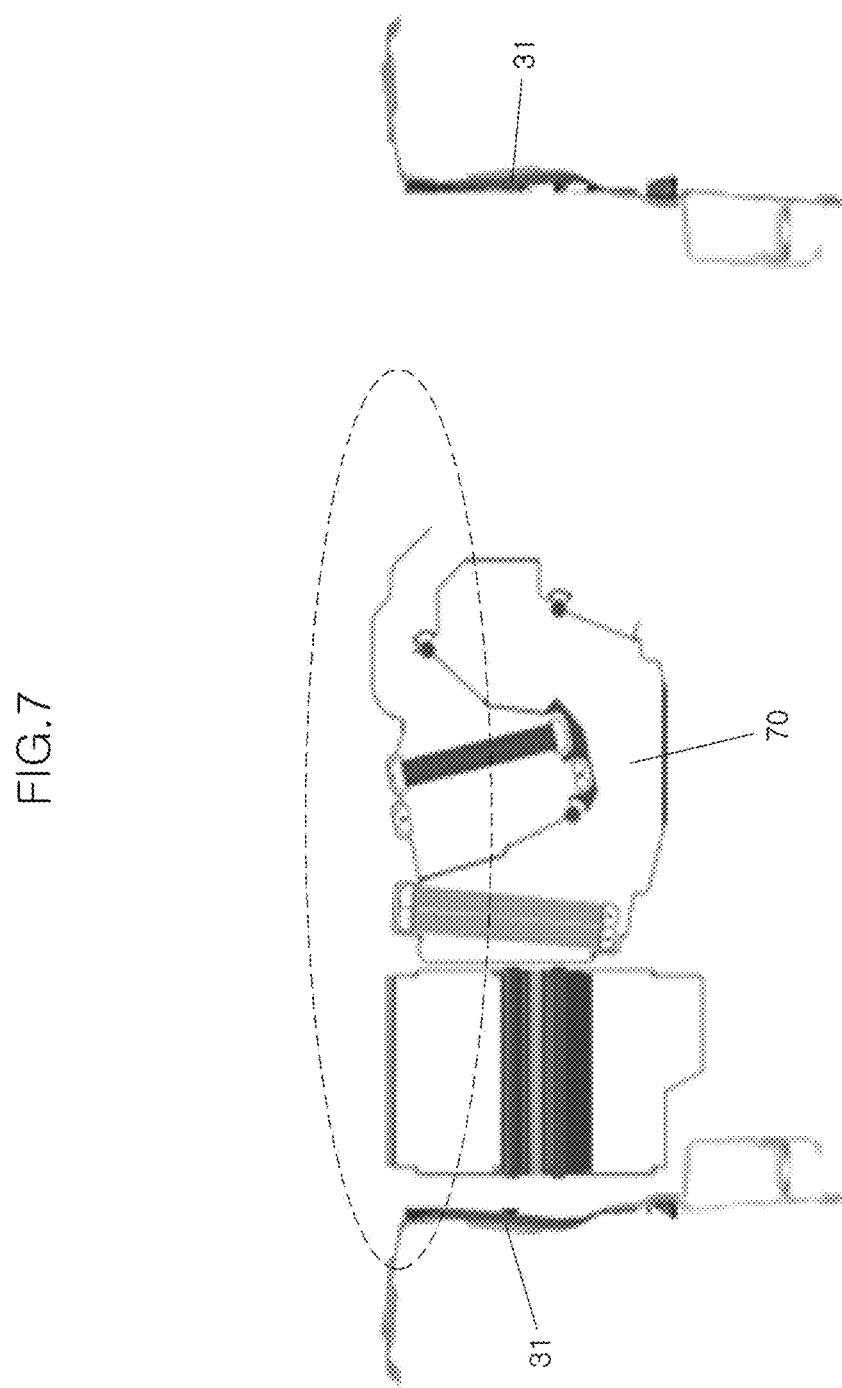

FRONT VEHICLE BODY STRUCTURE FOR VEHICLE

CROSS-REFERENCE TO RELATED APPLICATIONS

This application claims priority to Korean Patent Application No. 10-2018-0157416, filed on Dec. 7, 2018, which is incorporated herein by reference in its entirety.

TECHNICAL FIELD

The present disclosure relates to a front vehicle body structure for a vehicle capable of preventing interference between parts in an engine room of an eco-friendly vehicle.

BACKGROUND

Generally, a front vehicle body of a vehicle is positioned forwardly along the longitudinal direction of the vehicle to have a skeletal structure forming an engine room.

The space positioned in front of a passenger compartment which a passenger gets on in the vehicle is traditionally equipped with an engine, which is called so-called "engine room." In an electric vehicle in which an engine is not generally mounted, the space located in front of the passenger compartment is also generally referred to as an engine room.

In general, the electric vehicle uses the vehicle body structure of the vehicle at which the engine is mounted as it is, and the parts for the electric vehicle are mounted inside the engine room. For example, referring to FIG. 1 which shows an example of a front vehicle body structure according to prior art, inside the engine room are provided a battery pack for supplying power, a drive motor 101 for generating driving torque, various electric components for converting the power of the battery pack to be suitable to the drive motor 101, and a transmission for shifting the driving torque of the drive motor 101. Further, a cooling module 102 for cooling is provided. On the other hand, an air heat pump 170 is applied to the electric vehicle for indoor air conditioning.

However, in accordance with the above-described vehicle body structure of the prior art, since the front vehicle body structure of the vehicle forming the engine room is formed to be optimized to the vehicle at which the engine is mounted, there has been a problem of interfering with each other in mounting the parts for the electric vehicle using this front vehicle body structure.

The drive motor 101 for generating driving torque is installed between a front side member 121 and a fender apron member 122 which are formed along the longitudinal direction and disposed in the width direction of the vehicle, and a cooling module 103 is installed at front end portions. Further, an air heat pump 170 for air conditioning inside the vehicle is mounted therein.

However, there was a problem that a part of the air heat pump 170 interferes with the front vehicle body structure. For example, a part of the air heat pump 170 interferes with a cowl member. An upper portion of the air heat pump 170 interferes with the cowl member such as a cowl upper cross member 145 or a cowl top outer panel 151 (a portion marked with dotted lines in FIGS. 1 and 2), so that there was difficulty in mounting.

Furthermore, although the electric vehicle has the available space in the interior of the engine room compared to the vehicle equipped with an engine, the vehicle body structure of a general vehicle is used to limit the expansion of the space forward in the passenger compartment.

On the other hand, in order to avoid the interference between the air heat pump 170 and the front vehicle body structure, it is possible to modify the form of each constituent element that constitutes the front vehicle body structure, but it may be difficult to maintain rigidity in this case. Each constituent element constituting the front vehicle body structure has been developed as a shape whose shape can exercise the performance required for torsion, bending, vibration or impact, but it may not be able to exert its required performance if the shape is modified arbitrarily.

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure has been made to solve the above problems and provides a front vehicle body structure for a vehicle which is optimized to an eco-friendly vehicle such as an electric vehicle in order not to interfere with constituent elements mounted therein and can exercise a sufficient rigidity.

A front vehicle body structure for a vehicle according to an aspect of the present disclosure, which defines a space which is distinguished from a passenger compartment by a dash panel between front side members disposed along a longitudinal direction of the vehicle, may include: a front shock absorber housing in which a front shock absorber of a front wheel suspension of the vehicle is disposed; a cowl top outer panel connected with lower end portions of front pillars of the vehicle; and a cowl upper cross member arranged below the cowl top outer panel and having a front end portion attached to the front shock absorber housing and a rear end portion attached to the cowl top outer panel.

A front shock absorber upper support member connects an upper portion of the front shock absorber housing and the cowl upper cross member which connects the front pillars of the vehicle.

The front shock absorber upper support member has a width increasing from a front side to a rear side of the vehicle.

The front shock absorber upper support member may has an inner side, based on a width direction of the vehicle, parallel to the longitudinal direction of the vehicle.

A front end portion of the front shock absorber upper support member may be attached to a front shock absorber housing cover which is attached to an upper end portion of the front shock absorber housing.

An upper portion of the front shock absorber housing may include the front shock absorber housing cover, and both end portions of the front shock absorber side support member may be attached to the front shock absorber housing cover to define a closed cross-section.

A front shock absorber lower support member may connect a lower portion of the front shock absorber housing and the dash panel.

A front end portion and a rear end portion of the front shock absorber lower support member may be attached to the front shock absorber housing to define a closed cross-section.

An upper end portion and a lower end portion of the cowl upper cross member may be attached to the cowl top outer panel to define a closed-cross-section.

At least one or more penetration holes penetrating the dash panel may be defined at the dash panel.

An air heat pump may be disposed in a front side of the dash panel, at least one or more mounting brackets may be fastened to an outer surface of the air heat pump, and the at least one or more mounting brackets may fasten the air heat pump to at least any one of the cowl upper cross member, the front shock absorber housing and the front side members.

A rear end portion of an upper surface of the air heat pump may be fastened to the cowl upper cross member through an air heat pump upper fixing bracket.

One side surface of an upper surface of the air heat pump may be fastened to the front shock absorber housing through an air heat pump upper side mounting bracket.

One side surface of a lower surface of the air heat pump may be fastened to the front side members through an air heat pump lower side mounting bracket.

At least one or more stud bolts may be installed at the dash panel, at least one or more bracket portions into which the at least one or more stud bolts are inserted may be defined at the air heat pump, and the at least one or more bracket portions may be fastened to the at least one or more stud bolts so that the air heat pump is fixed to the dash panel.

The vehicle may be an electric vehicle.

In accordance with the front vehicle body structure for the vehicle of the present disclosure having the above-described configuration, it is possible to secure sufficient rigidity without causing the air heat pump to interfere with surrounding structures.

Further, by moving the position where the air heat pump is mounted from the position of the conventional air conditioning system forward, the utility of the front space of the passenger compartment is enhanced.

BRIEF DESCRIPTION OF THE DRAWINGS

The above and other objects, features and advantages of the present disclosure will be more clearly understood from the following detailed description taken in conjunction with the accompanying drawings, in which:

FIG. 6D is a cross-sectional view taken along the line C-C of FIG. 4;

FIG. 7 is a cross-sectional view of a portion where an air heat pump is installed in the front vehicle body structure for the vehicle according to an exemplary embodiment of the present disclosure;

DETAILED DESCRIPTION OF EMBODIMENTS

Figure 1:
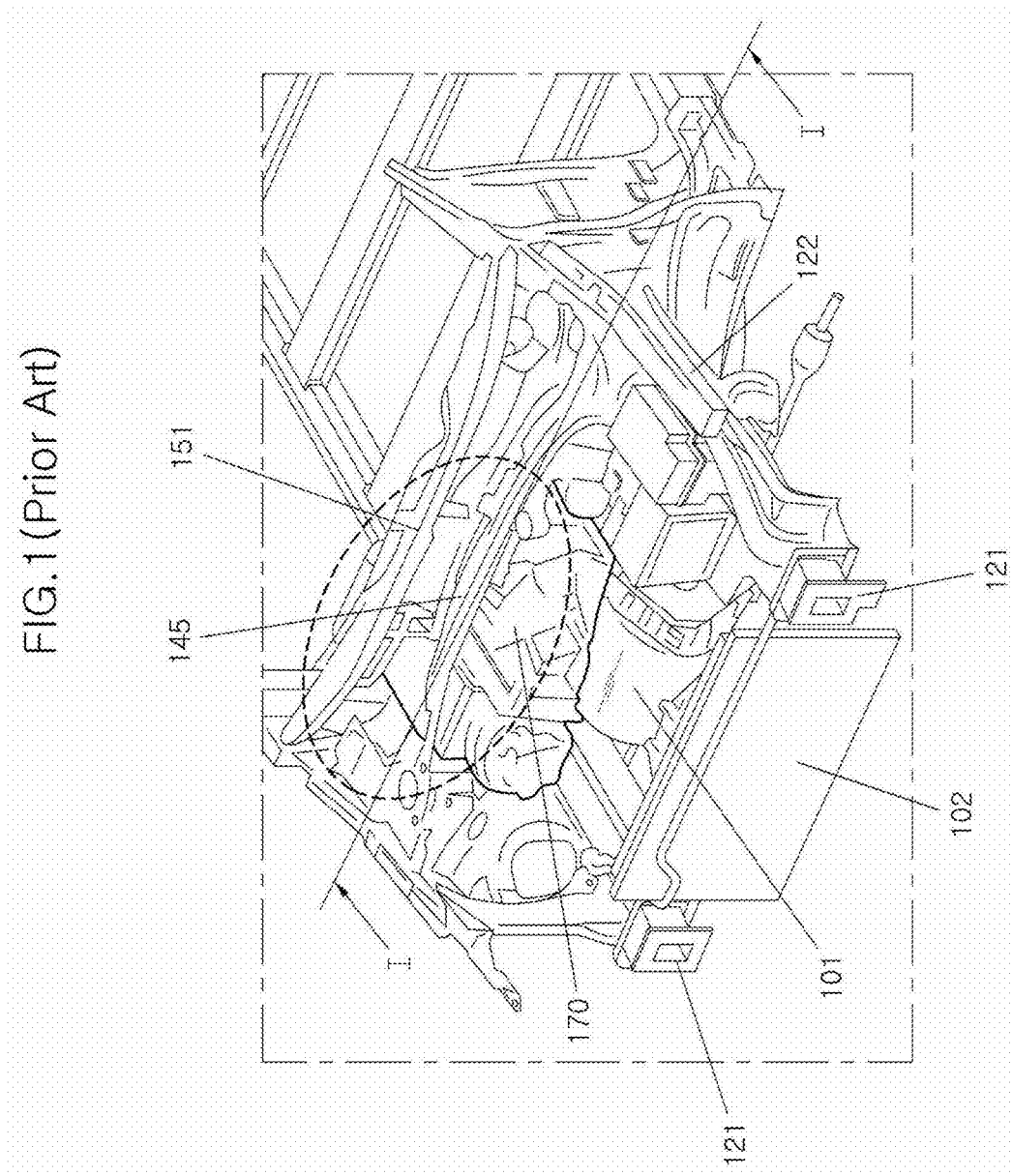
FIG. 1 is a perspective view showing a front vehicle body structure for a vehicle according to the prior art.
Figure 2:
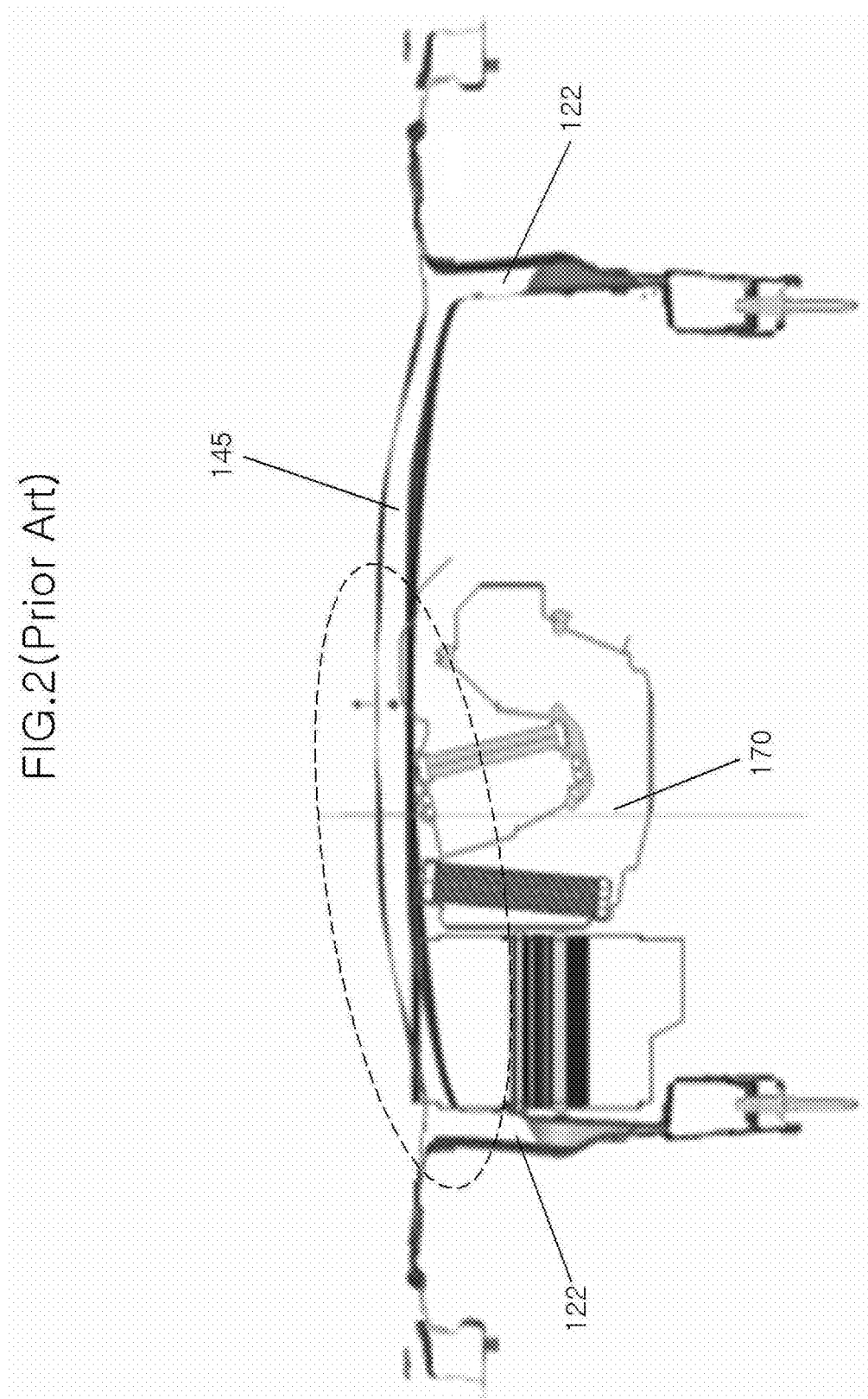
FIG. 2 is a cross-sectional view taken along the line I-I of FIG. 1.
Figure 3:
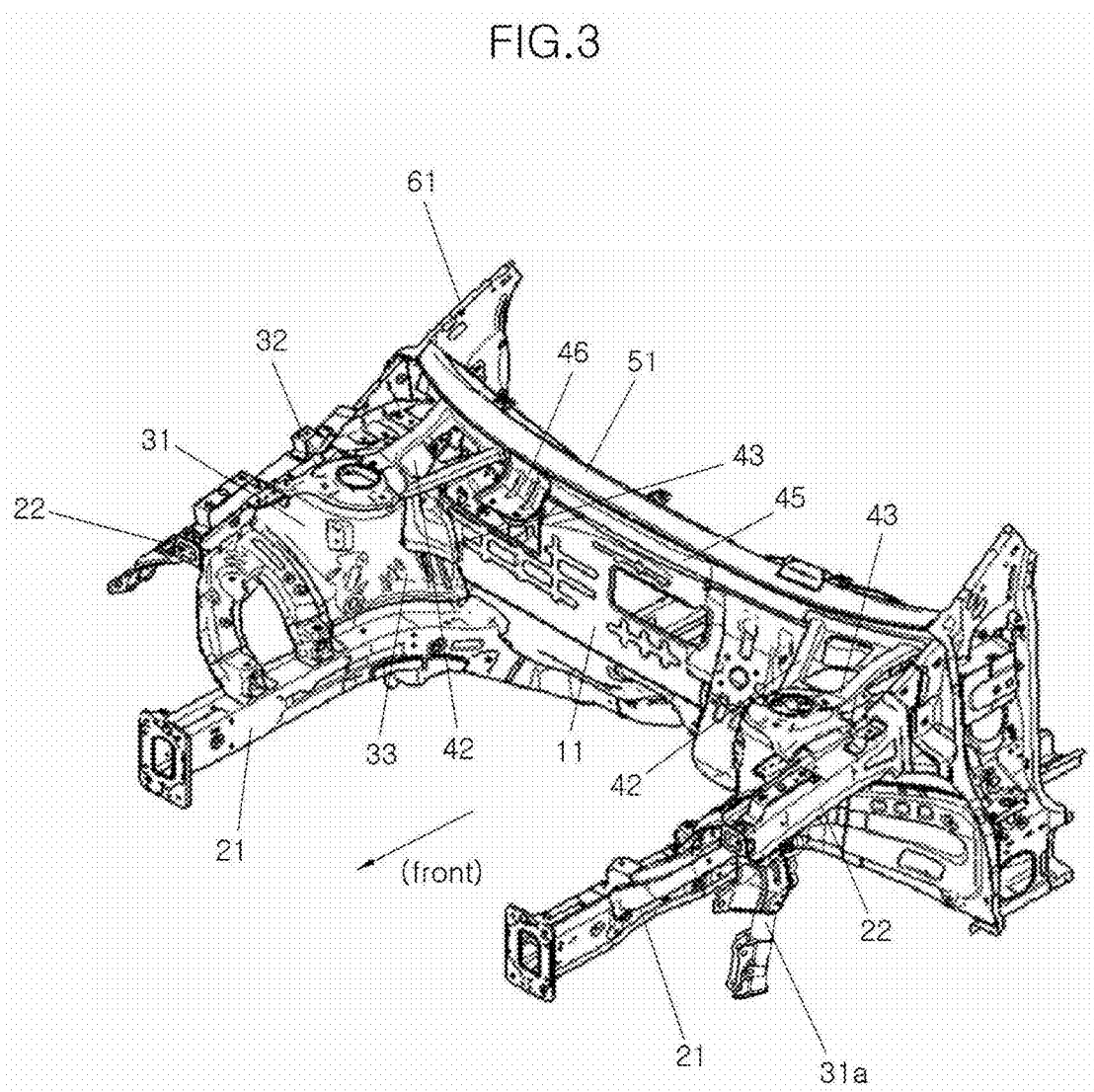
FIG. 3 is a perspective view showing a front vehicle body structure for a vehicle according to an exemplary embodiment of the present disclosure.
Figure 4:
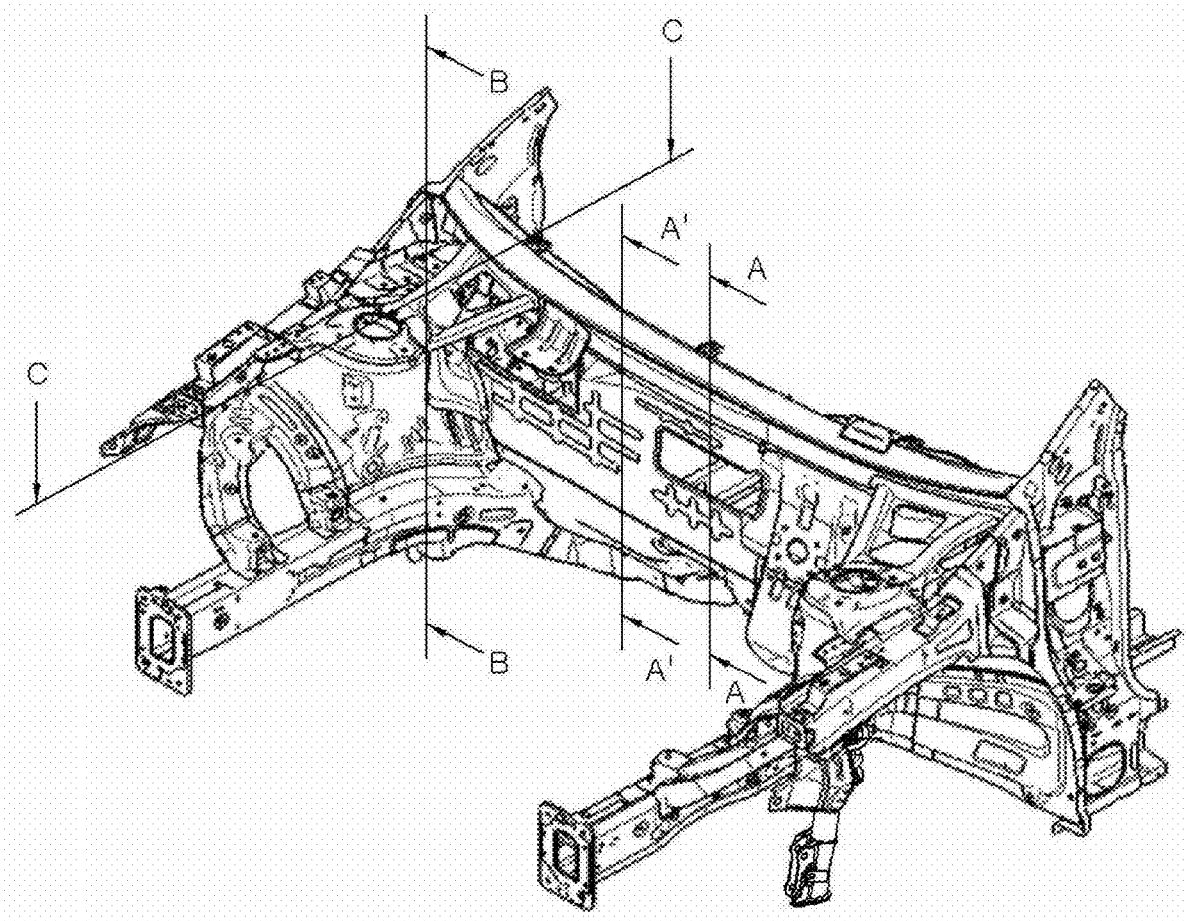
FIG. 4 is a perspective view showing cutting lines for showing a cross-sectional structure in the front vehicle body structure for the vehicle according to an exemplary embodiment of the present disclosure.
Figure 5:
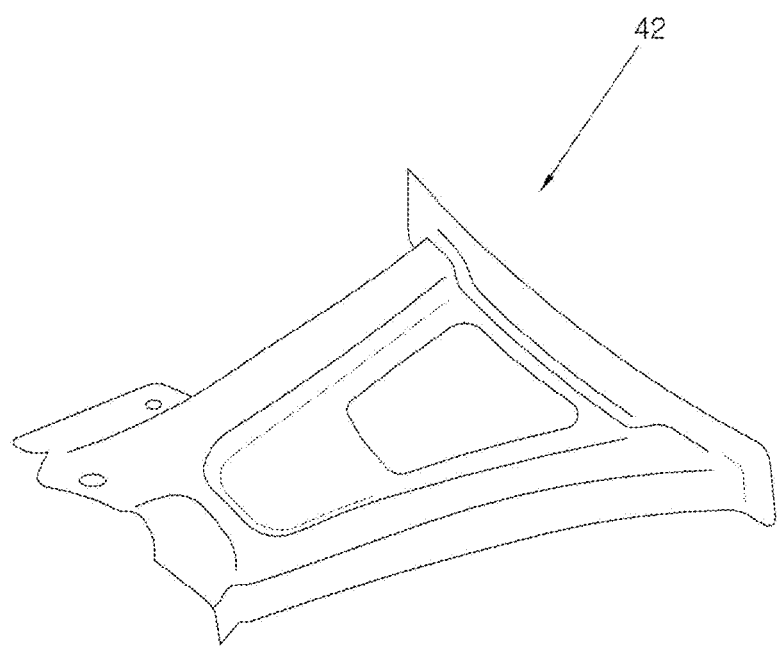
FIG. 5 is a perspective view showing a front shock absorber upper support member in the front vehicle body structure for the vehicle according to an exemplary embodiment of the present disclosure.

Hereinafter, a front vehicle body structure for a vehicle according to an exemplary embodiment of the present disclosure will be described in detail with reference to the accompanying drawings.

Referring to FIGS. 3-10, a front vehicle body structure for a vehicle according to an exemplary embodiment of the present disclosure defining a space which is distinguished from a passenger compartment by a dash panel 11 between front side members 21 disposed along the longitudinal direction of the vehicle and at which parts necessary for driving the vehicle are mounted, may include a front shock absorber housing 31 at which a front shock absorber 31a' of a front wheel suspension is mounted, a cowl top outer panel 51 connected with an lower end portion of a front pillar 61 of the vehicle, and a cowl upper cross member 45 being positioned below the cowl top outer panel 51 and having a front end portion bonded to the front shock absorber housing 31 and a rear end portion bonded to the cowl top outer panel 51.

The front vehicle body structure for the vehicle may be applied to an eco-friendly vehicle, particularly an electric vehicle.

The dash panel 11 may separate an engine room and a passenger compartment.

An upper end portion of the dash panel 11 may be connected with the cowl top outer panel 51 and a lower end portion thereof may be connected with a front floor panel.

At least one or more penetration holes 11a, 11b and 11c penetrating the dash panel 11 may be formed at the dash panel 11. Ducts may be penetrated through the penetration holes 11a, 11b and 11c.

A dash center member 12 may be provided in the rear of the dash panel 11 and may form a closed cross-section with the dash panel 11. The dash center member 12 may be provided at a portion where the penetration holes 11a, 11b and 11c are not formed.

The front side members 21 may be provided along the longitudinal direction of the vehicle at both sides of the vehicle, respectively.

A fender apron member 22 may distinguish the wheel and the engine room from the inside of a fender. The fender apron member 22 may be also provided at both sides of the vehicle. A lower end portion of the fender apron member 22 may be connected with the front side member 21.

A front end portion and an outer side surface of the front shock absorber housing 31 may be connected with the fender apron member 22 to accommodate a suspension therein. An upper portion of the front shock absorber housing 31 may be provided with a front shock absorber housing cover 32 to connect the front shock absorber housing 31 and the fender apron member 22, and a front shock absorber housing side member 33 may be provided at the inner side of the front shock absorber housing 31 to be connected with the front side member 21.

Both end portions of the cowl top outer panel 51 may be connected with one side of the front pillar 61, respectively.

A cowl upper cross member 45 of which both end portions are connected with the lower end portion of the front pillar 61, respectively, may be provided below the cowl top outer panel 51.

In the conventional front vehicle body structure, a load pass is formed by using a cowl cross member connecting front shock absorber housings of left and right sides, but in the present disclosure, a load pass is formed by using the cowl upper cross member 45.

The cowl upper cross member 45 may be connected through the front shock absorber housing 31 and a front shock absorber upper support member 42. A front end portion of the front shock absorber upper support member 42 may be connected with an upper end portion of the front shock absorber housing 31 and a rear end portion thereof may be connected with the cowl upper cross member 45, so that the cowl upper cross member 45 connects the front shock absorber housing 31. Accordingly, the load path formed through the cowl cross member is formed through the cowl upper cross member 45 and also formed through the front shock absorber upper support member 42 from the cowl upper cross member 45 to the front shock absorber housing 31. This allows the load path to be moved to the rear of the vehicle as compared with the prior art, which is advantageous in securing a space for installing an air heat pump 70. Since the cowl upper cross member 45 is located further rearward than the conventional cowl cross member, as shown in FIG. 7, it is possible avoid the phenomenon of overlapping with the cowl member at the upper end portion of the air heat pump 70.

The front shock absorber upper support member 42 may be formed to be wider from the front to the rear of the vehicle. Particularly, the front shock absorber upper support member 42 may be formed such that the inner side thereof is aligned with the longitudinal direction of the vehicle with respect to the width direction of the vehicle and the outer side thereof is formed so as to be closer to the side surface of the vehicle toward the rear of the vehicle. Accordingly, when the vehicle is in the frontal collision, the collision load is dispersed.

The front shock absorber upper support member 42 may be bonded to the front shock absorber housing cover 32 when bonded to an upper end portion of the front shock absorber housing 31.

The cowl upper cross member 45 may be bonded to the cowl top outer panel 51, and the cross-section of the portion where the cowl upper cross member 45 and the cowl top outer panel 51 are bonded with each other may be the closed cross-section. That is, as shown FIGS. 6A and 6B, an upper end portion and a lower end portion of the cowl upper cross member 45 may be bonded to the cowl top outer panel 51, respectively, to form the closed cross-section (the portion marked with dotted lines), so that it is possible to improve rigidity. An explained reference number 52 is a defrost duct mounting bracket in FIGS. 6A and 6B.

Figure 6A:
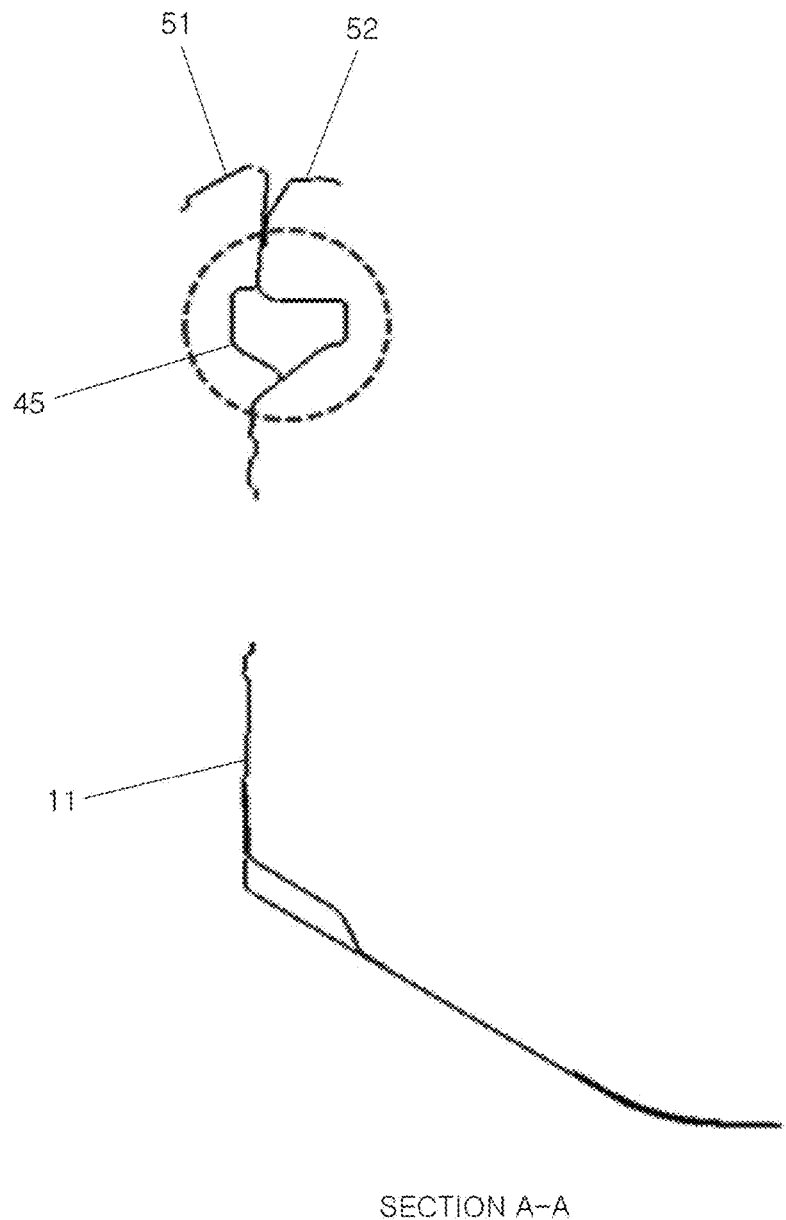
FIG. 6A is a cross-sectional view taken along the line A-A of FIG. 4.
Figure 6B:
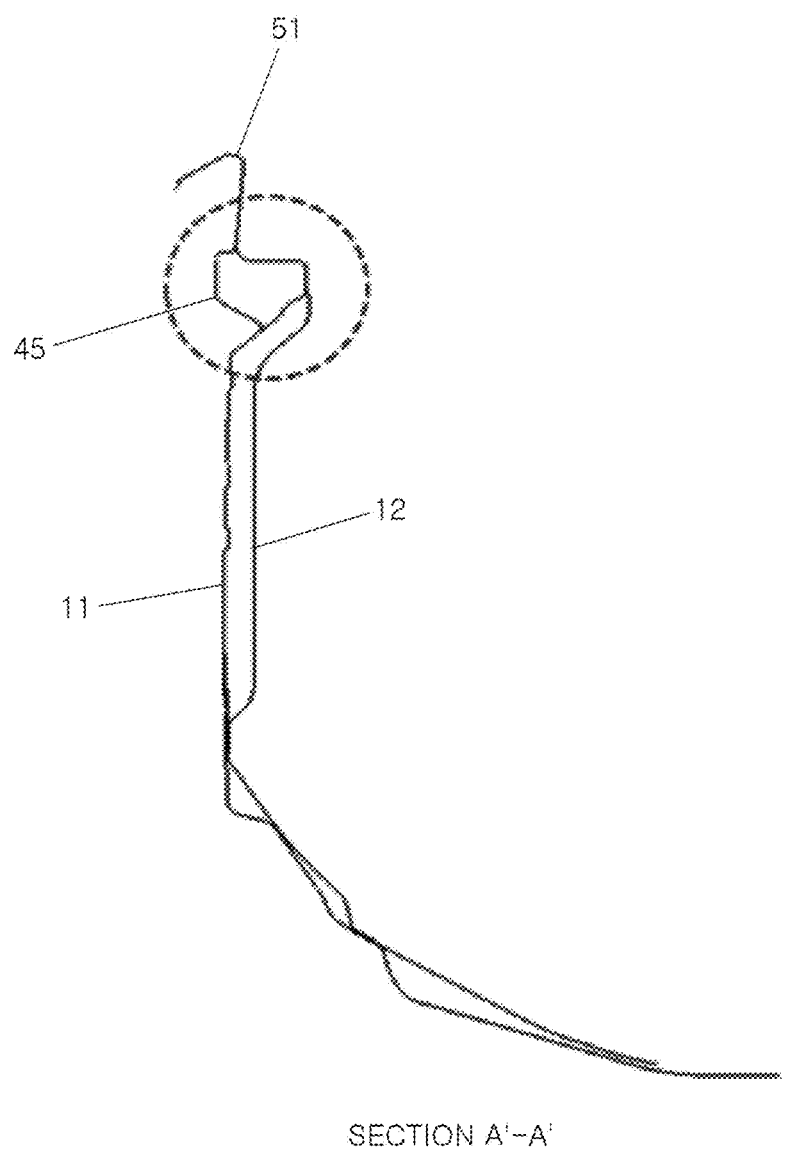
FIG. 6B is a cross-sectional view taken along the line A'-A' of FIG. 4.
Figure 6C:
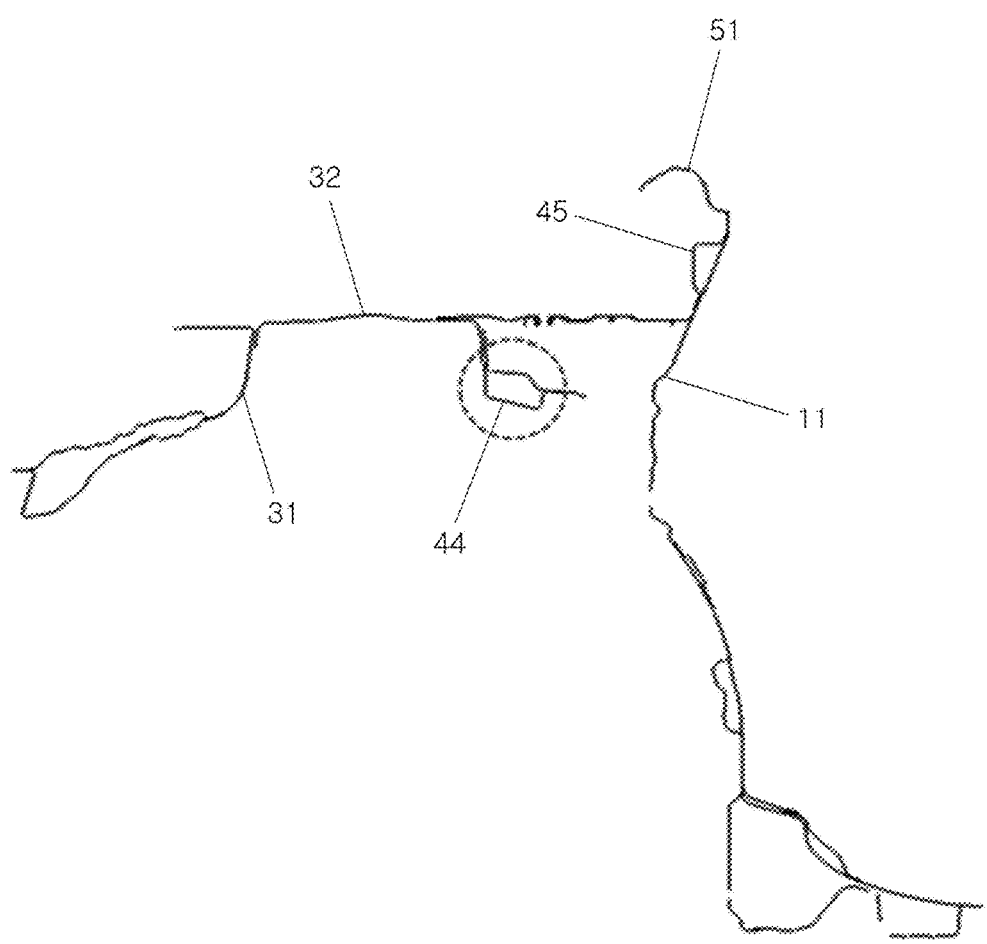
FIG. 6C is a cross-sectional view taken along the line B-B of FIG. 4.
Figure 8:
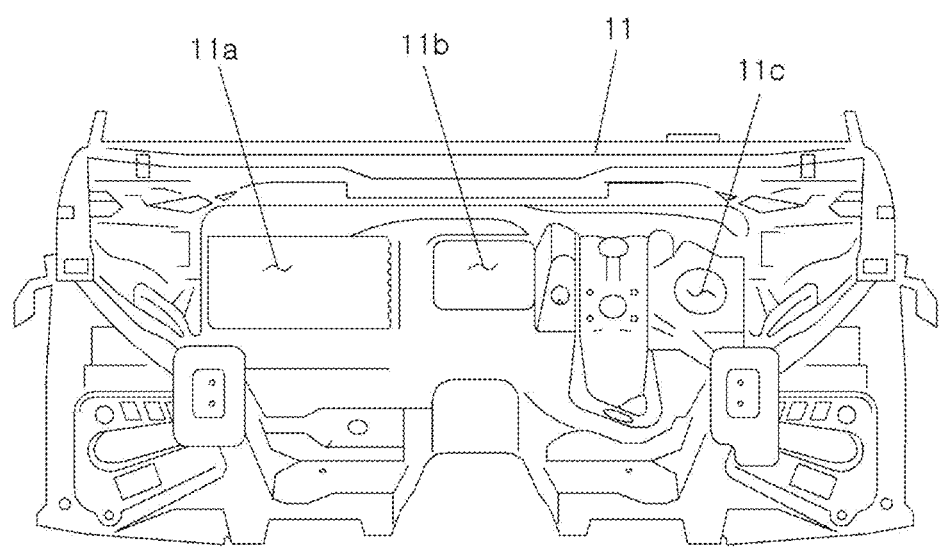
FIG. 8 is a front view of a dash panel in the front vehicle body structure for the vehicle according to an exemplary embodiment of the present disclosure.

The front shock absorber side support member 44 may be formed to be extended from the side surface of the front shock absorber housing 31 or the front shock absorber housing cover 32 to the inner side of the vehicle, and support the front shock absorber housing cover 32. For example, both end portions of the front shock absorber side support member 44, as shown in FIG. 6C, may be bonded to the front shock absorber housing cover 32, respectively. As like this, the closed cross-section (the portion marked with dotted lines) may be formed between the front shock absorber housing cover 32 and the front shock absorber side support member 44, so that rigidity is improved.

The front shock absorber housing 31 may be connected with the dash panel 11 in the lower portion of the front shock absorber housing 31 by using a front shock absorber lower support member 43. The lower portion of the front shock absorber housing 31 is connected with the dash panel 11 through the front shock absorber lower support member 43 so that a load pass for transmitting the load of the front shock absorber housing 31 to the dash panel 11 is formed.

As shown in FIG. 6D, a front end portion and a rear end portion of the front shock absorber lower support member 43 may be bonded to the front shock absorber housing 31, respectively, so that a closed cross-section (the portion marked with dotted lines) is formed.

Figure 9:
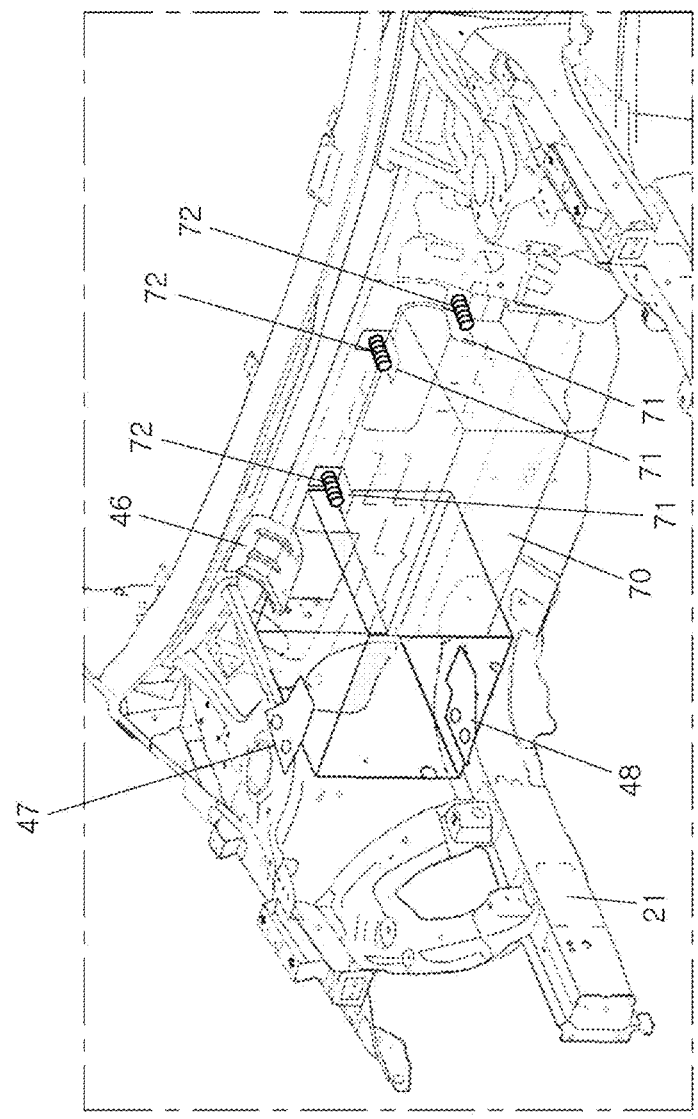
FIG. 9 is a perspective view showing an exemplary embodiment in which the air heat pump is installed in the front vehicle body structure for the vehicle according to the present disclosure.

FIG. 9 shows the configuration in which the air heat pump 70 is installed by using the front vehicle body structure for the vehicle according to an exemplary embodiment of the present disclosure.

At least one or more mounting brackets 46, 47 and 48 may be fastened to an outer surface of the air heat pump 70, and the air heat pump 70 may be fastened to the front vehicle body structure by using the mounting brackets 46, 47 and 48.

The mounting brackets 46, 47 and 48 may be installed at an upper surface or a lower surface of the air heat pump 70, and the air heat pump 70 is fastened to the cowl upper cross member 45, the front shock absorber housing 31 and the front side members 21 by using the mounting brackets 46, 47 and 48 so that the air heat pump 70 is installed.

A rear end portion of the upper surface of the air heat pump 70 may use an air heat pump upper fixing bracket 46 in order to fasten the cowl upper cross member 45. Both end portions of the air heat pump upper fixing bracket 46 may be bonded to the rear end portion of the upper surface of the air heat pump 70 and the cowl upper cross member 45, respectively, so that the rear end portion of the upper surface of the air heat pump 70 and the cowl upper cross member 45 are fastened with each other.

An upper end portion and a lower end portion of the side surface in the upper surface of the air heat pump 70 may be provided with an air heat pump upper side mounting bracket 47 and an air heat pump lower side mounting bracket 48, respectively, in order to fasten to the front shock absorber housing 31 and the front side members 21. The air heat pump upper side mounting bracket 47 and the air heat pump lower side mounting bracket 48 may be provided at one side surface of the upper end portion and the lower end portion of the side surface of the upper surface of the air heat pump 70, respectively, so that one side of the air heat pump 70 can be fastened to the front shock absorber housing 31 or the front side members 21.

That is, the air heat pump upper side mounting bracket 47 fastens the one side surface of the upper surface of the air heat pump 70 to the front shock absorber housing 31, and the air heat pump lower side mounting bracket 48 fastens one side surface of the lower surface of the air heat pump 70 to the front side members 21.

The air heat pump upper side mounting bracket 47 and the air heat pump lower side mounting bracket 48 may be formed as a separate bracket to be fastened to one side of the air heat pump 70, or integrally formed with the housing of the air heat pump 70 by extending a portion of the housing.

Further, the air heat pump upper side mounting bracket 47 and the air heat pump lower side mounting bracket 48 may also serve to regulate the height of the upper end portion and the lower end portion of the air heat pump 70.

On the other hand, at least one or more bracket portions 71 may be formed on the outer side surface of the air heat pump 70, and the air heat pump 70 is fixed to the dash panel 11 using the bracket portions 71. At least one or more stud bolts 72 may be installed on the dash panel 11 by welding. The bracket portions 71 and the stud bolts 72 may be formed at portions corresponding to each other, and the bracket portions 71 are inserted into and fastened to the stud bolt 72 so that the air heat pump 70 can be fixed to the dash panel 11.

Figure 10:
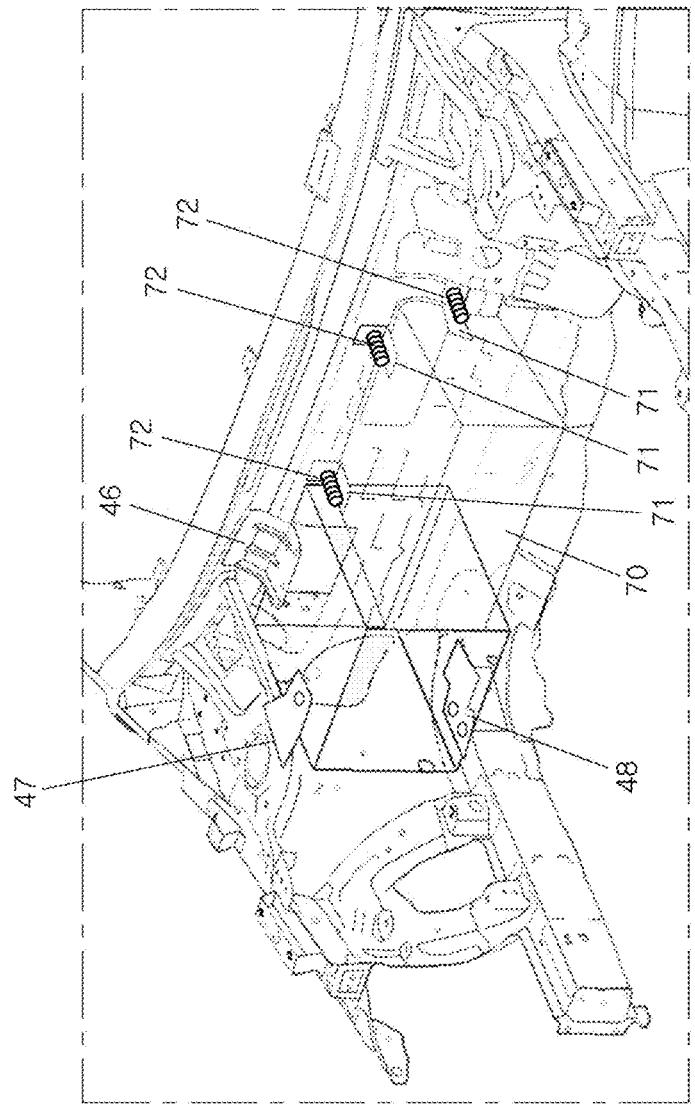
FIG. 10 is a perspective view showing another exemplary embodiment in which the air heat pump is installed in the front vehicle body structure for the vehicle according to the present disclosure.

FIG. 10 shows another exemplary embodiment in which the air heat pump 70 is installed by using the front vehicle body structure for the vehicle according to the present disclosure.

In a manner as shown in FIG. 9, the air heat pump 70 is fastened to the dash panel 11, the cowl upper cross member 45, the front shock absorber housing 31, and the front side members 21.

The air heat pump lower side mounting bracket 48 used to fasten the lower end portion of the air heat pump 70 to the front side members 21 is, however, formed in a T shape, so that the air heat pump lower side mounting bracket 48 is fastened to the upper surface of the front side members 21 and the lower surface of the air heat pump 70 and also fastened to the side surface of the front side members 21, thereby increasing the fastening force of the air heat pump lower side mounting bracket 48.

In accordance with the front vehicle body structure for the vehicle of the present disclosure having the above-described configuration, it is possible to secure sufficient rigidity without causing the air heat pump to interfere with surrounding structures.

Further, by moving forward the position where the air heat pump is mounted from the position of the conventional air conditioning system, the utility of the front space of the passenger compartment is enhanced.

While exemplary embodiments have been shown and described above, it will be apparent to those skilled in the art that modifications and variations could be made without departing from the scope of the present invention as defined by the appended claim. For example, the abovementioned exemplary embodiments may be partially combined with each other.

What is claimed is:

1. A front vehicle body structure for a vehicle defining a space which is distinguished from a passenger compartment by a dash panel between front side members disposed along a longitudinal direction of the vehicle, the front vehicle body structure comprising:
   a front shock absorber housing in which a front shock absorber of a front wheel suspension of the vehicle is disposed,
   a cowl top outer panel connected with lower end portions of front pillars of the vehicle, and
   a cowl upper cross member arranged below the cowl top outer panel, the cowl upper cross member having a front end portion attached to the front shock absorber housing and a rear end portion attached to the cowl top outer panel.

2. The front vehicle body structure of claim 1, further comprising a front shock absorber upper support member connected with an upper portion of the front shock absorber housing and the cowl upper cross member which is connected with the front pillars of the vehicle.

3. The front vehicle body structure of claim 2, wherein the front shock absorber upper support member has a width which increases from a front side to a rear side of the vehicle.

4. The front vehicle body structure of claim 3, wherein the front shock absorber upper support member has an inner side, based on a width direction of the vehicle, parallel to the longitudinal direction of the vehicle.

5. The front vehicle body structure of claim 2, wherein a front end portion of the front shock absorber upper support member is attached to a front shock absorber housing cover which is attached to an upper end portion of the front shock absorber housing.

6. The front vehicle body structure of claim 5, wherein an upper portion of the front shock absorber housing includes the front shock absorber housing cover, and
   wherein both end portions of the front shock absorber side support member are attached to the front shock absorber housing cover to define a closed cross-section.

7. The front vehicle body structure of claim 2, further comprising a front shock absorber lower support member connecting a lower portion of the front shock absorber housing and the dash panel.

8. The front vehicle body structure of claim 7, wherein a front end portion and a rear end portion of the front shock absorber lower support member are attached to the front shock absorber housing to define a closed cross-section.

9. The front vehicle body structure of claim 1, wherein an upper end portion and a lower end portion of the cowl upper cross member are attached to the cowl top outer panel to define a closed-cross-section.

10. The front vehicle body structure of claim 1, wherein at least one or more penetration holes penetrating the dash panel are defined at the dash panel.

11. The front vehicle body structure of claim 1, further comprising:
    an air heat pump disposed in a front side of the dash panel; and
    at least one or more mounting brackets fastened to an outer side surface of the air heat pump,
    wherein the at least one or more mounting brackets fasten the air heat pump to at least any one of the cowl upper cross member, the front shock absorber housing or the front side members.

12. The front vehicle body structure of claim 11, wherein a rear end portion of an upper surface of the air heat pump is fastened to the cowl upper cross member through an air heat pump upper fixing bracket.

13. The front vehicle body structure of claim 11, wherein one side surface of an upper surface of the air heat pump is fastened to the front shock absorber housing through an air heat pump upper side mounting bracket.

14. The front vehicle body structure of claim 11, wherein one side surface of a lower surface of the air heat pump is fastened to the front side members through an air heat pump lower side mounting bracket.

15. The front vehicle body structure of claim 11, wherein the dash panel has at least one or more stud bolts,
    wherein the air heat pump has at least one or more bracket portions into which the at least one or more stud bolts are inserted, and
    wherein the at least one or more bracket portions are fastened to the at least one or more stud bolts so that the air heat pump is fixed to the dash panel.

16. The front vehicle body structure of claim 1, wherein the vehicle includes an electric vehicle.

\* \* \* \* \*